United States Patent [19]
Tajima et al.

[11] Patent Number: 5,734,251
[45] Date of Patent: Mar. 31, 1998

[54] CONTROL APPARATUS FOR AC MOTOR

[75] Inventors: Hirokazu Tajima; Hidetoshi Umida, both of Tokyo; Hiroshi Tetsutani, Hyogo, all of Japan

[73] Assignee: Fuji Electric Co., Ltd., Kawasaki, Japan

[21] Appl. No.: 752,425

[22] Filed: Nov. 19, 1996

[30] Foreign Application Priority Data

Nov. 20, 1995 [JP] Japan .................................. 7-300861

[51] Int. Cl.$^6$ .............................. H02P 21/00; H02P 5/40
[52] U.S. Cl. .......................... 318/809; 318/804; 318/805
[58] Field of Search ................................ 318/138, 139, 318/245, 254, 439, 600–609, 800–832; 364/140–178

[56] References Cited

U.S. PATENT DOCUMENTS

| | | | |
|---|---|---|---|
| 3,895,275 | 7/1975 | Rostad | 318/812 |
| 4,887,015 | 12/1989 | Kurakake et al. | 318/609 |
| 4,926,105 | 5/1990 | Mischenko et al. | 318/800 |
| 5,272,429 | 12/1993 | Lipo et al. | 318/808 |
| 5,334,923 | 8/1994 | Lorenz et al. | 318/805 |
| 5,532,570 | 7/1996 | Tajima et al. | 318/809 |

*Primary Examiner*—Paul Ip
*Attorney, Agent, or Firm*—Greer, Burns & Crain, Ltd.

[57] ABSTRACT

A control apparatus for conducting a variable speed control of an AC motor by controlling an M-axis component and a T-axis component of a current flowing through the AC motor. The control apparatus comprises: M-axis current regulator for executing proportional plus integral computation on a difference between an actual value of the M-axis component and an M-axis current reference value to obtain an M-axis proportional value and an M-axis integration value, and for determining an M-axis voltage reference value by adding the M-axis proportional value to the M-axis integration value; T-axis current regulator for executing proportional plus integral computation on a difference between an actual value of the T-axis component and a T-axis current reference value to obtain a T-axis proportional value and a T-axis integration value, and for determining a T-axis voltage reference value by adding the T-axis proportional value to the T-axis integration value; and a renewal coefficient computing device for computing a vector sum of the M-axis voltage reference value and the T-axis voltage reference value, and determining a renewal coefficient for renewing the M-axis integration value and the T-axis integration value based on the relation between the vector sum and a predetermined output voltage limit value.

16 Claims, 13 Drawing Sheets

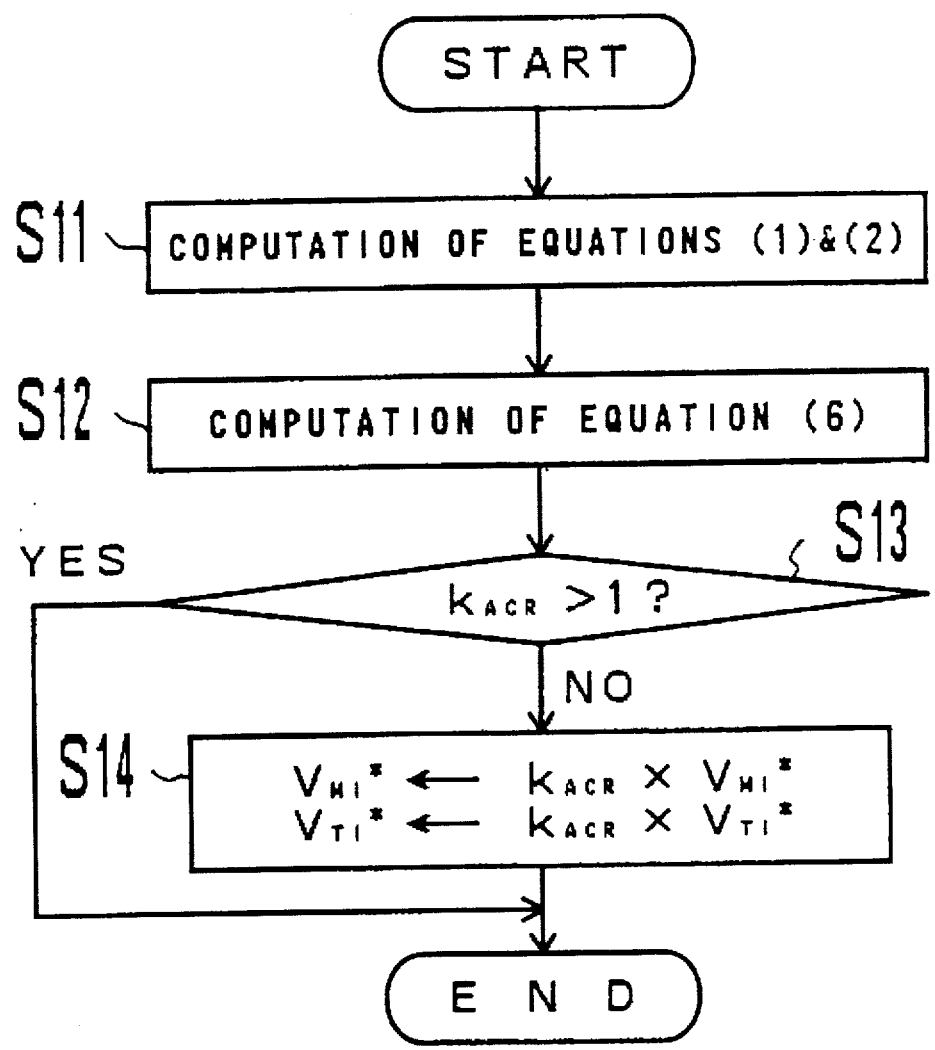
F I G. 1 1

CONTROL APPARATUS FOR AC MOTOR

BACKGROUND OF THE INVENTION

1. Field of the Invention

The present invention relates to a control apparatus for controlling an AC motor driven by an electric power converting circuit. More specifically, the present invention relates to a control apparatus for controllably varying the speed of an AC motor by trans-vector control.

2. Description of the Related Art

FIG. 1 is a block diagram of a conventional control apparatus for an AC motor. Referring to FIG. 1, a DC power supply 1 rectifies AC power, which is, for example commercially supplied AC power, to DC power. An inverter 2 is an electric power converter which converts a DC voltage Ed of the DC power supply 1 to a desired AC voltage. A current detector 4 detects the currents flowing from the inverter 2 to an induction motor 3 as an example of an AC motor. A speed detector 5 has a pulse generator or such a means for detecting and outputting an actual value ωr of the rotating speed of the induction motor 3.

A control apparatus 10 includes a reference speed setting device 11, a speed regulator 12, a slip frequency computing device 13, an integrator 14, a first coordinate transformer circuit 15, a T-axis current regulator 16, an M-axis current regulator 17, and a second coordinate transformer circuit 18.

A reference speed value ωr* of the induction motor 3 is set to the reference speed setting device 11. The speed regulator 12 executes a proportional plus integral computation of a difference between the reference speed value ωr* and the actual speed value ωr, and outputs a reference torque current value, i.e. a T-axis current reference value $I_T^*$, of the induction motor 3. The slip frequency computing device 13 computes a slip frequency of the induction motor 3 based on the output of the speed regulator 12. The integrator 14 integrates the sum of the slip frequency and the actual speed value ωr and outputs the rotation angle θ* of the induction motor 3.

The first coordinate transformer circuit 15 executes coordinate transformation of the current values detected by the current detector 4 on the basis of the rotation angle θ*, and computes an actual M-axis current value $I_M$, that is a current component on the axis of the coordinate (M-axis) parallel to the magnetic field of the induction motor 3, and an actual T-axis current value $I_T$, that is a current component on the axis of the coordinate (T-axis) perpendicular to the M-axis.

The T-axis current regulator 16 executes a proportional plus integral computation of a difference between the T-axis current reference value $I_T^*$ and the actual T-axis current value $I_T$, and outputs a T-axis voltage reference value $V_T^*$. The M-axis current regulator 17 executes a proportional plus integral computation of a difference between an M-axis current reference value $I_M^*$ as a reference magnetizing current value based on a reference magnetic flux of the induction motor 3 and the actual M-axis current value $I_M$, and outputs an M-axis voltage reference value $V_M^*$. The second coordinate transformer circuit 18 executes coordinate transformation on the basis of the foregoing T-axis voltage reference value $V_T^*$, M-axis voltage reference value $V_M^*$, and rotation angle θ*, and generates gate signals for the semiconductor switching devices which constitute the inverter 2.

In FIG. 1, the maximum AC voltage which the inverter 2 outputs is determined by the DC voltage Ed of the DC power supply 1. If the DC voltage Ed drops, the output voltages from the inverter 2 saturate before reaching the voltage reference values $V_T^*$ and $V_M^*$. In this state, the actual current values $I_T$ and $I_M$ do not coincide with the respective reference values $I_T^*$ and $I_M^*$. As a result the differences, inputted to the respective integrator circuits of the T-axis and M-axis current regulators 16 and 17, do not converge to zero and have respective stationary errors, due to which the result of the integral computation of each integrator circuit diverges. This phenomenon is called "windup".

FIG. 2 is a block diagram of a conventional T-axis current regulator 16, and FIG. 3 is a block diagram of a conventional M-axis current regulator 17. As shown in these figures, the conventional T-axis and M-axis current regulators 16 and 17 have respective limiters 16d and 17d for limiting the output values thereof within respective predetermined limit values $V_{TL}$ and $V_{ML}$.

In the conventional control apparatus for an AC motor, the windup is prevented from being caused by setting the respective predetermined limit values $V_{TL}$ and $V_{ML}$ to the output values of the respective integrator circuits of the T-axis and M-axis current regulators 16 and 17. In this countermeasure, the M-axis and T-axis voltage reference values, which are the outputs from the respective current regulators 16 and 17, may cause the following problem.

Since the M-axis is made to coincide with the direction of the magnetic field in the variable speed control of the induction motor, the actual T-axis voltage value $V_T$ is the sum of the induced electromotive force of the induction motor and the voltage drop caused by the resistance and inductance of the induction motor. On the other hand, the actual M-axis voltage value $V_M$ consists only of the voltage drop across the resistance and inductance of the induction motor. Thus, the relation $V_M \ll V_T$ generally applies. Therefore, when the output voltages of the inverter 2 saturate due to a lowering of the DC voltage Ed, the output $V_T^*$ of the T-axis current regulator reaches the foregoing limit value in advance and, subsequently, the output $V_M^*$ of the M-axis current regulator diverges. Therefore, the magnitude of $V_M^*$ is no longer appropriate one with respect to the magnitude of $V_T^*$. As a result, the torque current and the magnetic field due to the magnetizing current fail to keep an orthogonal phase angle relation to each other; that is, mis-orientation is caused between the T- and M-axes. In this state, a variable speed control of the induction motor can no longer be appropriately conducted any more.

SUMMARY OF THE INVENTION

In view of the foregoing, it is an object of the present invention to provide a control apparatus for controlling an AC motor which appropriately limits the outputs of the respective integrator circuits of the T-axis and M-axis current regulators so that the outputs of the respective integrator circuits do not diverge individually to cause the mis-orientation between the axes even when the output voltages of the inverter saturate.

A control apparatus according to the invention is for conducting a variable (adjustable) speed control of an AC motor by controlling an M-axis component and a T-axis component of a current flowing through the AC motor, the direction of the M-axis component being parallel to a magnetic field of the AC motor, and the direction of the T-axis component being orthogonal to the direction of the M-axis current component. The control apparatus comprises: an M-axis current regulator for executing proportional plus integral computation on a difference between an actual value of the M-axis component and an M-axis current reference value to obtain an M-axis proportional value and an M-axis integration value, and for determining an M-axis voltage reference value for controlling the AC motor by adding the M-axis proportional value to the M-axis integration value; a T-axis current regulator for executing proportional plus integral computation on a difference between an actual value of the T-axis component and a T-axis current reference value to obtain a T-axis proportional value and a T-axis integration value, and for determining a T-axis voltage reference value for controlling the AC motor by adding the T-axis proportional value to the T-axis integration value; and a renewal coefficient computing device for computing a vector sum of the M-axis voltage reference value and the T-axis voltage reference value or the M-axis integration value and the T-axis integration value, determining a renewal coefficient for renewing the M-axis integration value and the T-axis integration value based on the relation between the vector sum and a predetermined output voltage limit value, and outputting the renewal coefficient to the M-axis current regulator and the T-axis current regulator.

The renewal coefficient computing device sets the renewal coefficient to a value obtained by dividing the output voltage limit value by the vector sum, and when the renewal coefficient is equal to or smaller than 1 or a predetermined value, the M-axis current regulator renews (updates) the M-axis voltage reference value by adding the M-axis proportional value to a product of the M-axis integration value and the renewal coefficient, and the T-axis current regulator renews (updates) the T-axis voltage reference value by adding the T-axis proportional value to a product of the T-axis integration value and the renewal coefficient.

The control apparatus may further comprise: a compensation voltage computing device for computing an M-axis voltage compensation value and a T-axis voltage compensation value based on the actual values of the M-axis and T-axis current components, the M-axis and T-axis current reference values and an equivalent resistance value and an equivalent inductance value of the AC motor; an M-axis adder for setting a new M-axis voltage reference value to be a sum of the M-axis voltage compensation value and the M-axis voltage reference value output from the M-axis current regulator; and a T-axis adder for setting a new T-axis voltage reference value to be a sum of the T-axis voltage compensation value and the T-axis voltage reference value output from the T-axis current regulator.

A control method according to the invention is for conducting a variable speed control of an AC motor by controlling an M-axis component and a T-axis component of a current flowing through the AC motor, the direction of the M-axis component being parallel to a magnetic field of the AC motor, and the direction of the T-axis component being orthogonal to the direction of the M-axis current component. The control method comprises the steps of: executing proportional plus integral computation on a difference between an actual value of the M-axis component and an M-axis current reference value to obtain an M-axis proportional value and an M-axis integration value, and determining an M-axis voltage reference value for controlling the AC motor by adding the M-axis proportional value to the M-axis integration value; executing proportional plus integral computation on a difference between an actual value of the T-axis component and a T-axis current reference value to obtain a T-axis proportional value and a T-axis integration value, and determining a T-axis voltage reference value for controlling the AC motor by adding the T-axis proportional value to the T-axis integration value; and computing a vector sum of the M-axis voltage reference value and the T-axis voltage reference value or the M-axis integration value and the T-axis integration value, and determining a renewal coefficient for renewing the M-axis integration value and the T-axis integration value based on the vector sum and a predetermined output voltage limit value.

The control method may further comprise the steps of: setting the renewal coefficient at a value obtained by dividing the output voltage limit value by the vector sum; renewing (updating) the M-axis voltage reference value by adding the M-axis proportional value to a product of the M-axis integration value and the renewal coefficient when the renewal coefficient is equal to or smaller than 1 or a predetermined value; and renewing (updating) the T-axis voltage reference value by adding the T-axis proportional value to a product of the T-axis integration value and the renewal coefficient when the renewal coefficient is equal to or smaller than 1 or the predetermined value.

The control method may further comprise the steps of: computing an M-axis voltage compensation value and a T-axis voltage compensation value based on the actual values of the M-axis and T-axis current components, the M-axis and T-axis current reference values, and an equivalent resistance value and an equivalent inductance value of the AC motor; setting a new M-axis voltage reference value at a sum of the M-axis voltage compensation value and the M-axis voltage reference value; and setting a new T-axis voltage reference value at a sum of the T-axis voltage compensation value and the T-axis voltage reference value.

According to the prior art, the integral computation values of the M- and T-axis current regulators are limited individually. However, in conducting the variable speed control of an AC motor by the trans-vector control according to the present invention, the integral computation results of the M- and T-axis current regulators are limited simultaneously based on the vector sum of the output voltages from the respective current regulators, or on the vector sum of the integral values of the respective current regulators. Therefore, the orthogonal phase angle relation between the torque current and the magnetic field of the AC motor is maintained all the time, even when the output of the integral circuit of each current regulator reaches the limit value thereof.

BRIEF DESCRIPTION OF THE DRAWINGS

FIG. 11 is a flow chart describing the control actions of the M-axis current regulator, the T-axis current regulator, and the renewal coefficient computing device of FIG. 10.

DESCRIPTION OF THE PREFERRED EMBODIMENT

Figure 1:
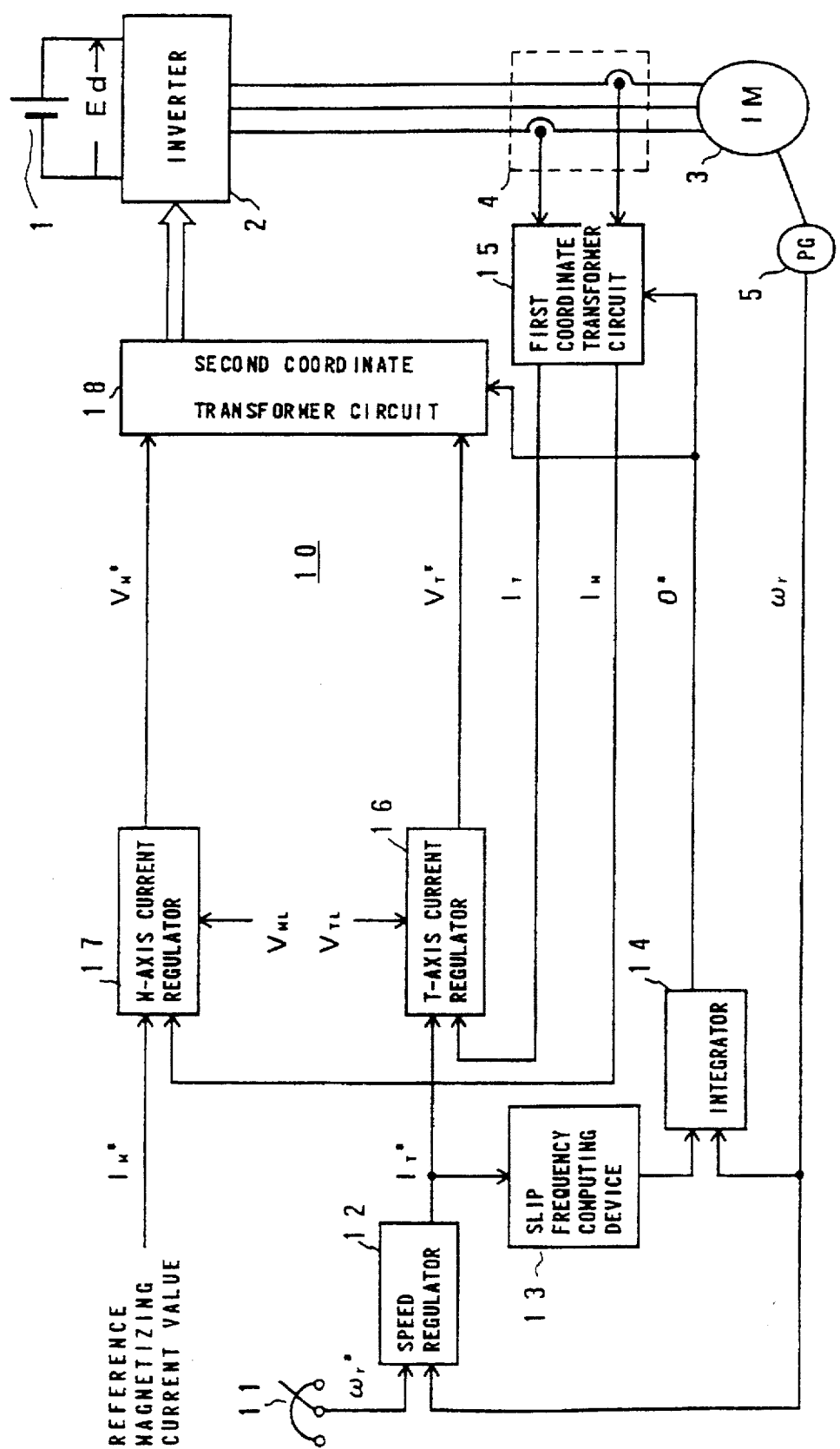
FIG. 1 is a block diagram of a conventional control apparatus for an AC motor.
Figure 2:
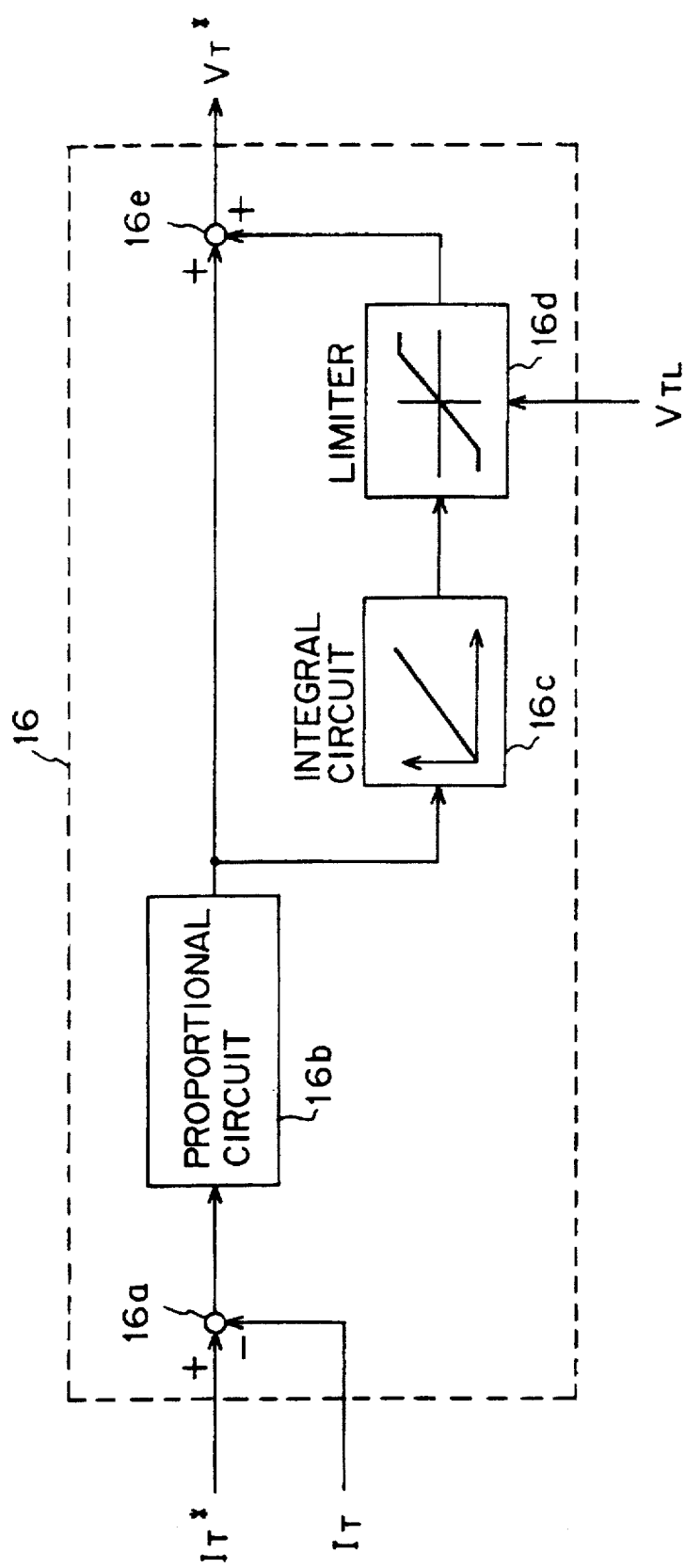
FIG. 2 is a block diagram of a conventional T-axis current regulator.
Figure 3:
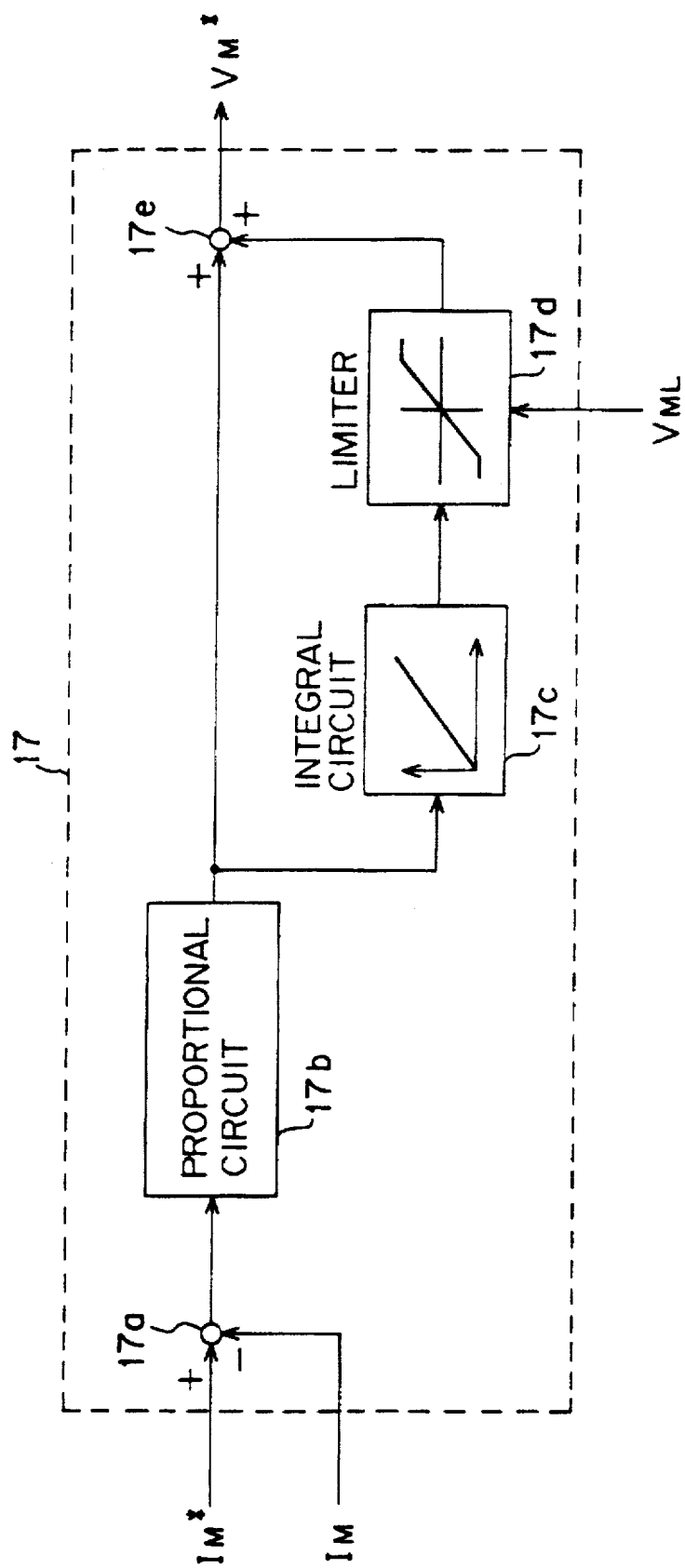
FIG. 3 is a block diagram of a conventional M-axis current regulator.
Figure 4:
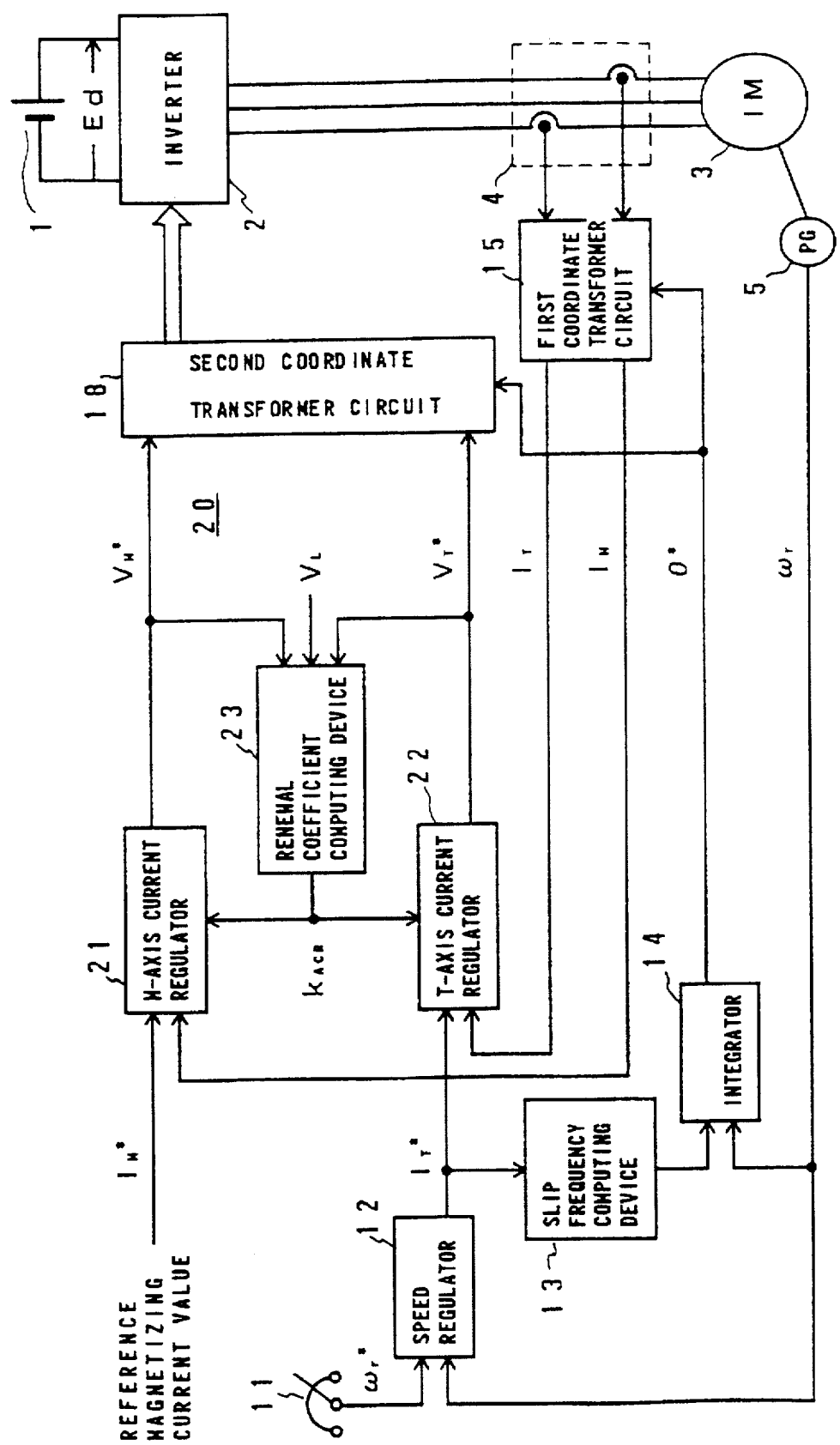
FIG. 4 is a block diagram of a first embodiment of a control apparatus for controlling an AC motor according to the present invention.

FIG. 4 is a block diagram showing the configuration of a first embodiment of a control apparatus for controlling an AC motor according to the present invention. In FIG. 4, the same elements as those in FIG. 1 are designated by the same reference numerals and their explanations are omitted.

Referring to FIG. 4, a control apparatus 20 for the induction motor (AC motor) 3 includes an M-axis current regulator 21, a T-axis current regulator 22, and a renewal coefficient computing device 23 for an integration computation. The M-axis current regulator 21 executes proportional and integral computation of a difference between an M-axis current reference value $I_M^*$ and the actual M-axis current value $I_M$, and outputs an M-axis voltage reference value $V_M^*$. The T-axis current regulator 22 executes a proportional plus integral computation of a difference between the T-axis current reference value $I_T^*$ and the actual T-axis current value $I_T$, and outputs a T-axis voltage reference value $V_T^*$. The renewal coefficient computing device 23 computes the vector sum of the M-axis voltage value $V_M^*$ and the T-axis voltage value $V_T^*$, and computes a renewal coefficient $k_{ACR}$ based on the relation between the vector sum and a predetermined output voltage limit value $V_L$. When the computed renewal coefficient $k_{ACR}$ is equal to or smaller than 1, the renewal coefficient computing device 23 outputs the $k_{ACR}$ to the M-axis current regulator 21 and the T-axis current regulator 22. The M-axis current regulator 21 and the T-axis current regulator 22 multiply the respective integral computation results (M-axis integration value $V_{MI}^*$ and T-axis integration value $V_{TI}^*$) thereof by $k_{ACR}$ to renew the respective integral computation results $V_{MI}^*$ and $V_{TI}^*$ thereof.

Figure 5:
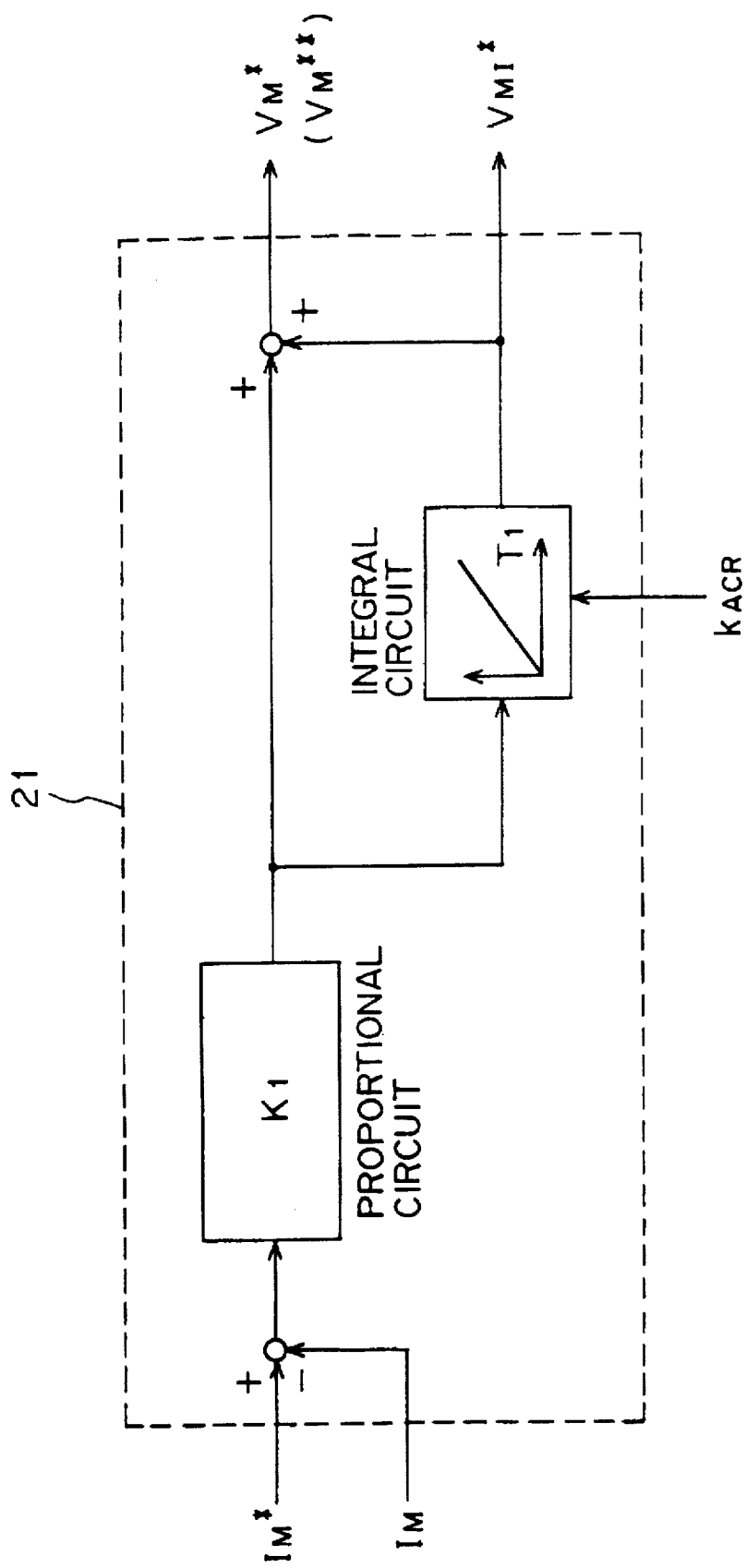
FIG. 5 is a block diagram of the M-axis current regulator of the control apparatus according to the present invention.

FIG. 5 is a block diagram showing the circuit configuration of the M-axis current regulator 21, which executes a proportional plus integral computation expressed by the following equation (1).

$$V_M^* = V_{MP}^* + V_{MI}^* \qquad (1)$$
$$= K_1(I_M^* - I_M) + K_1(I_M^* - I_M)/(T_1 \cdot s)$$

Here, $K_1$ is a proportional gain and $T_1$ is an integral time constant. The first term and the second term on the right side of the equation (1) are a proportional term (M-axis proportional value $V_{MP}^*$) output from the proportional circuit of the M-axis current regulator 21 and an integral term (M-axis integration value $V_{MI}^*$) output from the integral circuit, respectively.

$V_M^{}$ in FIG. 5 is an M-axis voltage reference value of the third and fourth embodiments to be described later. $V_M^{}$ is equivalent to $V_M^*$.

Figure 6:
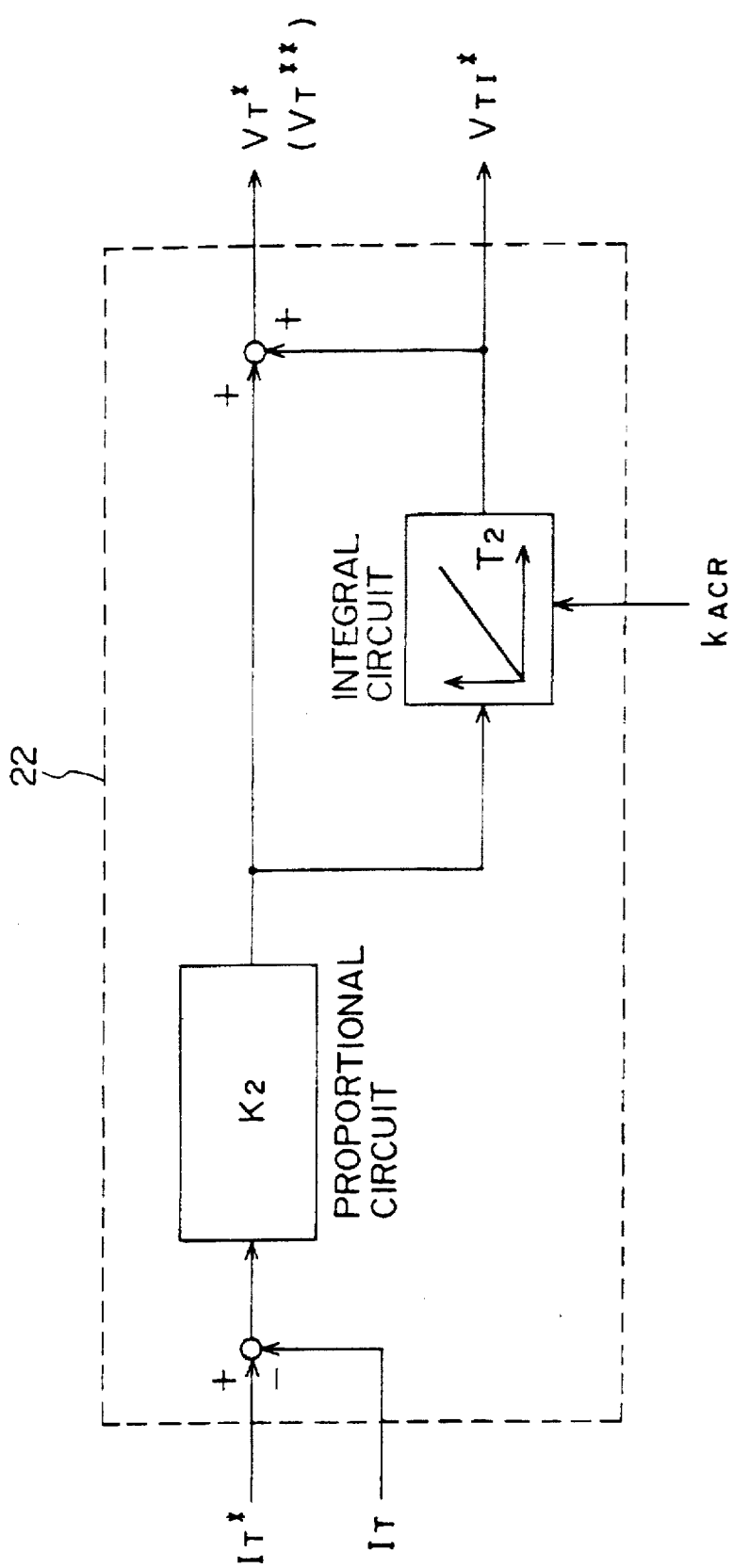
FIG. 6 is a block diagram of the T-axis current regulator of the control apparatus according to the present invention.

FIG. 6 is a block diagram showing the circuit configuration of the T-axis current regulator 22, which executes a proportional plus integral computation expressed by the following equation (2).

$$V_T^* = V_{TP}^* + V_{TI}^* \qquad (2)$$
$$= K_2(I_T^* - I_T) + K_2(I_T^* - I_T)/(T_2 \cdot s)$$

Here, $K_2$ is a proportional gain and $T_2$ is an integral time constant. The first term and the second term on the right side of the equation are a proportional term (T-axis proportional value $V_{TP}^*$) output from the proportional circuit of the T-axis current regulator and an integral term (T-axis integration value $V_{TI}^*$) Output from the integral circuit, respectively.

$V_T^{}$ in FIG. 6 is a T-axis voltage reference value of the third and fourth embodiments to be described later. $V_T^{}$ is equivalent to $V_T^*$.

Figure 7:
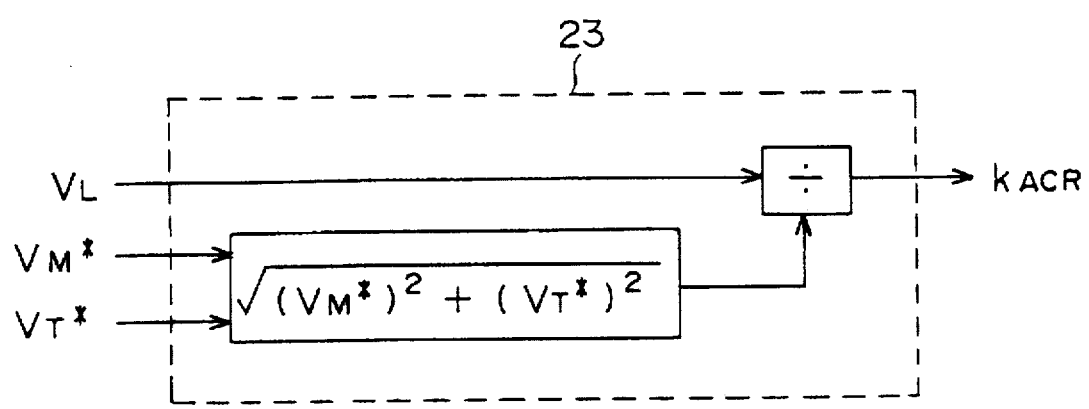
FIG. 7 is a block diagram of a renewal coefficient computing device of the control apparatus according to the present invention.

FIG. 7 is a block diagram showing the configuration of the renewal coefficient computing device 23, which computes the following equation (3).

$$k_{ACR} = V_L/\{(V_M^*)^2 + (V_T^*)^2\}^{1/2} \qquad (3)$$

Figure 8:
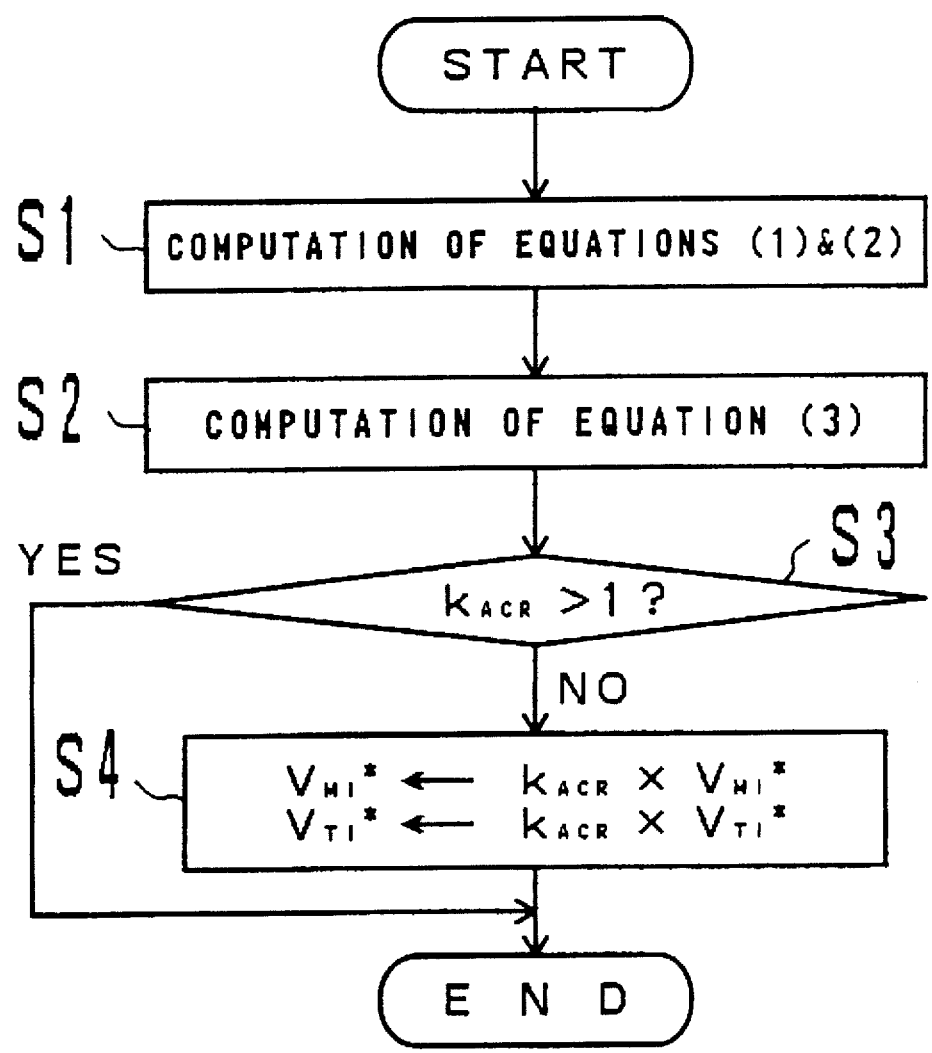
FIG. 8 is a flow chart describing the control actions of the M-axis current regulator, the T-axis current regulator, and the renewal coefficient computing device of FIG. 7.

FIG. 8 is a flow chart describing the control actions of the M-axis current regulator 21, T-axis current regulator 22, and renewal coefficient computing device 23.

Referring now to FIG. 8, the above described equations (1) and (2) are computed in step S1. The above described equation (3) is computed in step S2 on the basis of the $V_M^*$ and $V_T^*$ obtained in step S1. When the $k_{ACR}$ is larger than 1 in step S3 (step S3, Yes), the variable speed control of the induction motor 3 is conducted on the basis of the results of computing the equations (1) and (2).

When the $k_{ACR}$ is equal to or smaller than 1 in step S3 (step S3, No), the integral terms $V_{MI}^*$ and $V_{TI}^*$ obtained in step S1 are renewed in step S4 by multiplying the integral terms $V_{MI}^*$ and $V_{TI}^*$ in step S1 with the $k_{ACR}$ computed in step S2, and the variable speed control of the induction motor 3 is conducted by using the renewed integral values.

Figure 9:
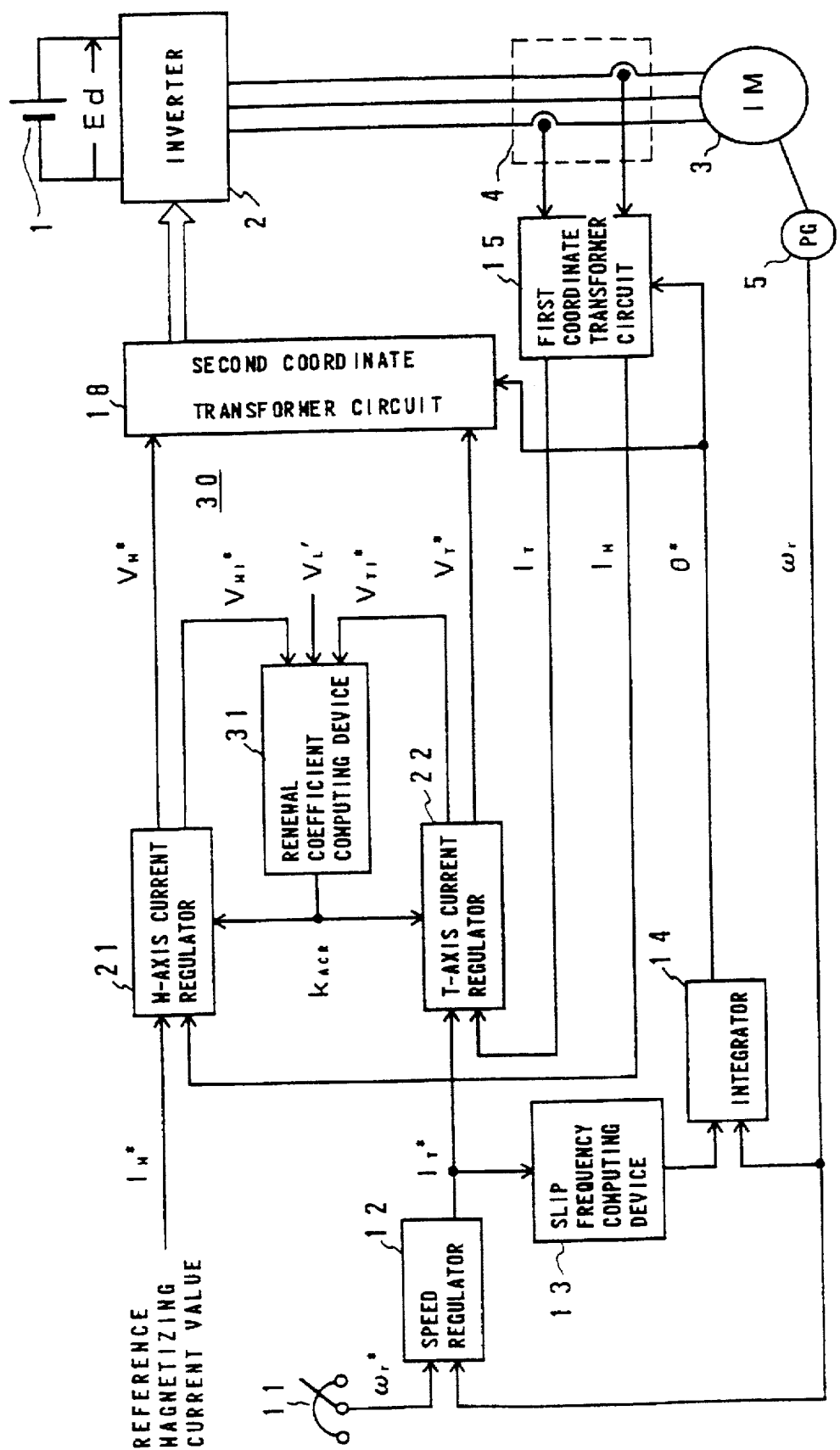
FIG. 9 is a block diagram of a second embodiment of a control apparatus for controlling an AC motor according to the present invention.

FIG. 9 is a block diagram showing the configuration of a second embodiment of a control apparatus for controlling an AC motor according to the present invention. In FIG. 9, the same elements as those in FIGS. 1 and 4 are designated by the same reference numerals and their explanations are omitted.

As shown in FIG. 9, a control apparatus 30 of the second embodiment includes the M-axis current regulator 21, the T-axis current regulator 22 and a renewal coefficient computing device 31. The M-axis current regulator 21 outputs the M-axis voltage reference value $V_M^*$ and the integral computation result $V_{MI}^*$ to the coordinate transformer circuit 18 and the renewal coefficient computing device 31, respectively. The T-axis current regulator 22 outputs the T-axis voltage reference value $V_T^*$ and the integral computation result $V_{TI}^*$ to the coordinate transformer circuit 18 and the renewal coefficient computing device 31, respectively.

The renewal coefficient computing device 31 computes a vector sum of the integral computation result (the integral term $V_{MI}^*$) from the integral circuit of the M-axis current regulator 21 and the integral computation result (the integral term $V_{TI}^*$) from the integral circuit of the T-axis current regulator 22, and computes a renewal coefficient $k_{ACR}$ based on the relation between the vector sum and a predetermined output voltage limit value $V_L'$. When the computed renewal coefficient $k_{ACR}$ is equal to or smaller than 1, the renewal coefficient computing device 31 outputs the renewal coefficient $k_{ACR}$ to the M-axis current regulator 21 and the T-axis current regulator 22. The M-axis current regulator 21 and the T-axis current regulator 22 multiply the respective integral computation results ($V_{MI}^*$ and $V_{TI}^*$) thereof by $k_{ACR}$ to renew the respective integral computation results ($V_{MI}^*$ and $V_{TI}^*$) thereof.

Figure 10:
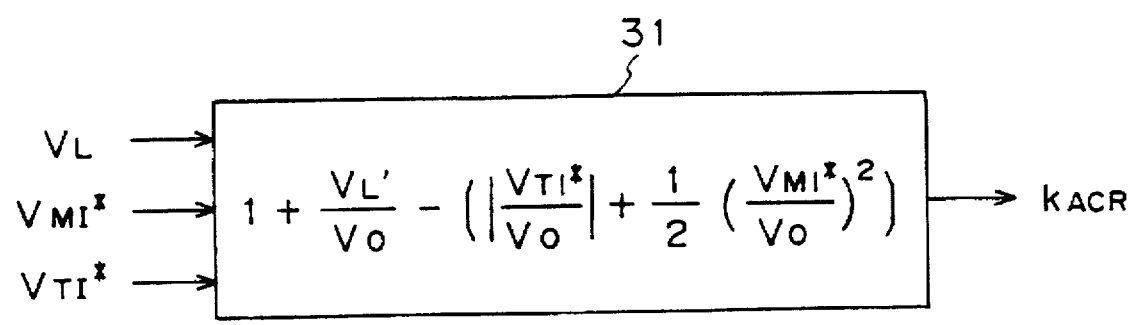
FIG. 10 is a block diagram of another renewal coefficient computing device according to the present invention.

FIG. 10 is a block diagram showing the function of the renewal coefficient computing device 31, which computes the following equation (4).

$$k_{ACR} = V_L'/\{(V_{MI}^*)^2 + (V_{TI}^*)^2\}^{1/2} \qquad (4)$$

In the trans-vector control of the induction motor 3, saturation of the outputs from the inverter 2 causes problems in a region in which the output voltages of the inverter 2 are high. If the rated voltage of the induction motor 3 is represented by $V_O$, the ratios $V_T^*/V_O$ and $V_{TI}^*/V_O$ are almost equal to 1 and the ratios $V_M^*/V_O$ and $V_{MI}^*/V_O$ are much smaller than 1, when the output voltages of the inverter 2 are high. Therefore, the equation (4) can be approximated as described by the following equation (5).

$$V_L/\{(V_{MI}^*)^2 + (V_{TI}^*)^2\}^{1/2} = 1 + (V_L'/V_O) - \{|V_{TI}^*/V_O| + 0.5(V_{MI}^*/V_O)^2\} \qquad (5)$$

That is, the renewal coefficient $k_{ACR}$ can be computed approximately by the following equation (6).

$$k_{ACR} = 1 + (V_L'/V_O) - \{|V_{TI}^*/V_O| + 0.5(V_{MI}^*/V_O)^2\} \qquad (6)$$

The approximate expression (5) is applicable to approximate computation of the above described equation (3).

FIG. 11 is a flow chart describing the control actions of the M-axis current regulator 21, T-axis current regulator 22, and renewal coefficient computing device 31.

Referring to FIG. 11, the above described equations (1) and (2) are computed in step S11, and the above described equation (6) is computed in step S12 on the basis of the $V_{MI}^*$ and $V_{TI}^*$ obtained in step S11. When the $k_{ACR}$ is larger than 1 in step S13 (step S13, Yes), the variable speed control of the induction motor 3 is conducted on the basis of the results of computing the equations (1) and (2).

When the $k_{ACR}$ is equal to or smaller than 1 in step S13 (step S13, No), the integral terms $V_{MI}^*$ and $V_{TI}^*$ obtained in step S11 are renewed in step S14 by multiplying the integral terms $V_{MI}^*$ and $V_{TI}^*$ obtained in step S11 with the $k_{ACR}$ computed in step 12, and the variable speed control of the induction motor 3 is conducted by using the renewed integral values.

Figure 12:
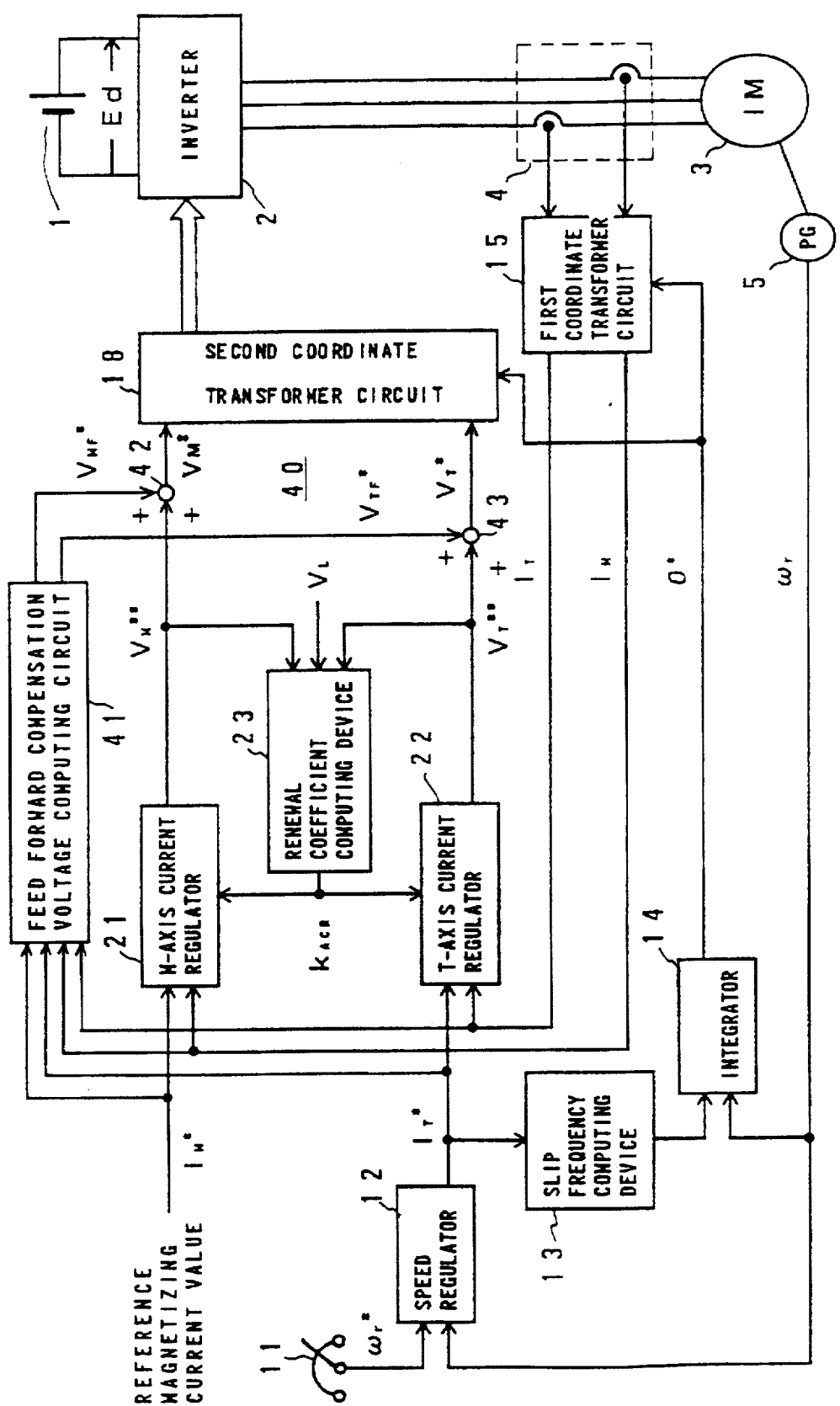
FIG. 12 is a block diagram of a third embodiment of a control apparatus for controlling an AC motor according to the present invention.

FIG. 12 is a block diagram of a third embodiment of a control apparatus for controlling an AC motor according to the present invention. In FIG. 12, the same elements as those in FIGS. 1, 4 and 9 are designated by the same reference numerals and their explanations are omitted.

As shown in FIG. 12, a control apparatus 40 of the third embodiment includes the M-axis current regulator 21, the T-axis current regulator 22, the renewal coefficient computing device 23, a feed forward compensation voltage computing circuit 41, an M-axis adder 42, and a T-axis adder 43. The M-axis current regulator 21 outputs an M-axis voltage reference value $V_M^{}$ to the renewal coefficient computing device 23 and the M-axis adder 42, and the T-axis current regulator 22 outputs a T-axis voltage reference value $V_T^{}$ to the renewal coefficient computing device 23 and the T-axis adder 43. The renewal coefficient computing device 23 determines and outputs the renewal coefficient $k_{ACR}$ based on the relation between the voltage reference values $V_M^{}$ and $V_T^{}$ and the predetermined voltage limit value $V_L$ in the same manner as that of the first embodiment.

The feed forward compensation voltage computing circuit 41 computes an M-axis compensation voltage value $V_{MF}^*$ and a T-axis compensation voltage value $V_{TF}^*$ based on the actual M-axis current component $I_M$, the M-axis current reference value $I_M^*$, the actual T-axis current component $I_T$, the T-axis current reference value $I_T^*$, the equivalent resistance value of the induction motor 3, and the equivalent inductance value of the induction motor 3. The feed forward compensation voltage computing circuit 41 outputs the compensation voltage values $V_{MF}^*$ and $V_{TF}^*$ to the M-axis adder 42 and the T-axis adder 43, respectively. The M-axis adder 42 adds the M-axis voltage reference value $V_M^{**}$ and the M-axis compensation voltage value $V_{MF}^*$ to obtain the corrected M-axis voltage reference value $V_M^*$. The T-axis adder 43 adds the T-axis voltage reference value $V_T^{**}$ and the T-axis compensation voltage value $V_{TF}^*$ to obtain the corrected T-axis voltage reference value $V_T^*$.

Since the function of the feed forward compensation voltage computing circuit 41 belongs to a well known prior art, its explanation will be omitted.

The M-axis current regulator 21, T-axis current regulator 22, and a renewal coefficient computing device 23 in FIG. 12 execute the control operations thereof in the same manner as described by the flow chart of FIG. 8.

Figure 13:
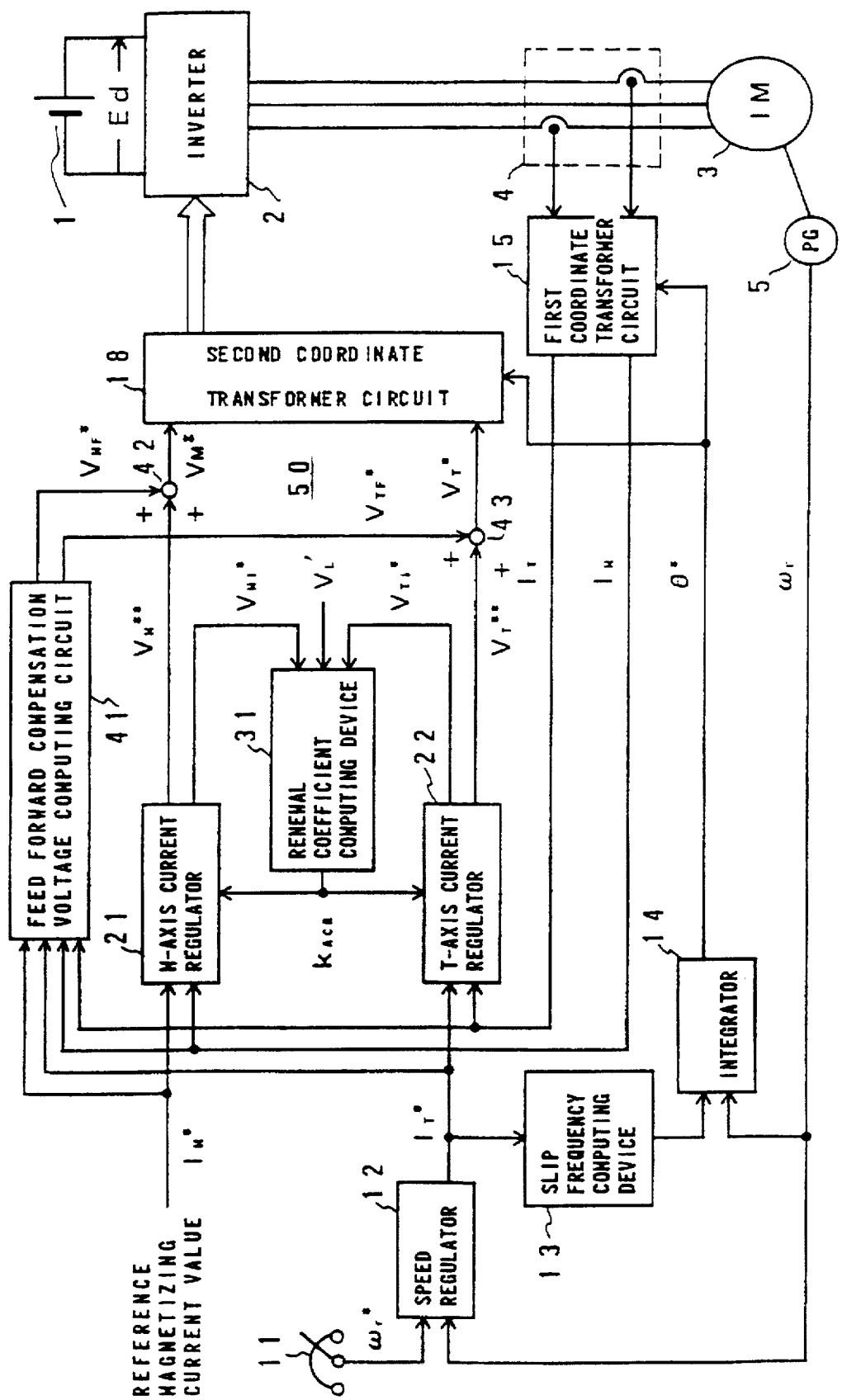
FIG. 13 is a block diagram of a fourth embodiment of a control apparatus for controlling an AC motor according to the present invention.

FIG. 13 is a block diagram showing the configuration of a fourth embodiment of a control apparatus for controlling an AC motor according to the present invention. In FIG. 13, the same elements as those in FIGS. 1, 4, 9 and 12 are designated by the same reference numerals, and their explanations are omitted.

As shown in FIG. 13, a control apparatus 50 of the fourth embodiment includes the M-axis current regulator 21, the T-axis current regulator 22, the renewal coefficient computing device 31, the feed forward compensation voltage computing circuit 41, the M-axis adder 42, and the T-axis adder 43. The M-axis current regulator 21 outputs an M-axis voltage reference value $V_M^{**}$ and the integral computation result $V_{MI}^*$ to the M-axis adder 42 and the renewal coefficient computing device 31, respectively. The T-axis current regulator 22 outputs a T-axis voltage reference value $V_T^{**}$ and the integral computation result $V_{TI}^*$ to the T-axis adder 43 and the renewal coefficient computing device 31, respectively. The renewal coefficient computing device 31 determines and outputs the renewal coefficient $k_{ACR}$ based on the integral computation results $V_{MI}^*$ and $V_{TI}^*$ and the predetermined voltage limit value $V_L'$ in the same manner as that of the second embodiment.

The feed forward compensation voltage computing circuit 41 computes an M-axis compensation voltage value $V_{MF}^*$ and a T-axis compensation voltage value $V_{TF}^*$ based on the actual M-axis current component $I_M$, the M-axis current reference value $I_M^*$, the actual T-axis current component $I_T$, the T-axis current reference value $I_T^*$, the equivalent resistance value of the induction motor 3, and the equivalent inductance value of the induction motor 3. The feed forward compensation voltage computing circuit 41 outputs the compensation voltage values $V_{MF}^*$ and $V_{TF}^*$ to the M-axis adder 42 and the T-axis adder 43, respectively. The M-axis adder 42 adds the M-axis voltage reference value $V_M^{**}$ and the M-axis compensation voltage value $V_{MF}^*$ to obtain the corrected M-axis voltage reference value $V_M^*$. The T-axis adder 43 adds the T-axis voltage reference value $V_T^{**}$ and the T-axis compensation voltage value $V_{TF}^*$ to obtain the corrected T-axis voltage reference value $V_T^*$.

The M-axis current regulator 21, T-axis current regulator 22, and a renewal coefficient computing device 31 in FIG. 13 execute the control operations thereof in the same manner as described by the flow chart of FIG. 11.

In conducting the variable speed control of an induction motor by the trans-vector control according to the present invention, the voltage reference values $V_M^*$ and $V_T^*$ of the M- and T-axes are limited simultaneously, based on the vector sum of the output voltages from the respective current regulators, or on the vector sum of the integral computation values $V_{MI}^*$ and $V_{TI}^*$ of the respective current regulators. As a result, the orthogonal phase angle relation between the torque current and the magnetic field of the induction motor is maintained all the time, even when the DC voltage input to the inverter which drives the induction motor lowers to cause saturation of the inverter output. Furthermore, an overcurrent due to too large an M-axis voltage component of the motor is prevented from being caused in the induction motor.

What is claimed is:

1. A control apparatus for conducting a variable speed control of an AC motor by controlling an M-axis component and a T-axis component of a current flowing through said AC motor, the direction of said M-axis component being parallel to a magnetic field of said AC motor and the direction of said T-axis component being orthogonal to the direction of said M-axis current component, said control apparatus comprising:

M-axis current regulation means for executing proportional plus integral computation on a difference between an actual value of said M-axis component and an M-axis current reference value to obtain an M-axis proportional value and an M-axis integration value, and for determining an M-axis voltage reference value for controlling said AC motor by adding said M-axis proportional value to said M-axis integration value;

T-axis current regulation means for executing proportional plus integral computation on a difference between an actual value of said T-axis component and a T-axis current reference value to obtain a T-axis proportional value and a T-axis integration value, and for determining a T-axis voltage reference value for controlling said AC motor by adding said T-axis proportional value to said T-axis integration value; and renewal coefficient computing means for computing a vector sum of said M-axis voltage reference value and said T-axis voltage reference value, determining a renewal coefficient for renewing said M-axis integration value and said T-axis integration value based on said vector sum and a predetermined output voltage limit value, and outputting said renewal coefficient to said M-axis current regulation means and said T-axis current regulation means.

2. The control apparatus according to claim 1, wherein when said renewal coefficient is equal to or smaller than a predetermined value, said M-axis current regulation means renews said M-axis integration value so that said M-axis integration value becomes a result of a product of said M-axis integration value and said renewal coefficient, and said T-axis current regulation means renews said T-axis integration value so that said T-axis integration value becomes a result of a product of said T-axis integration value and said renewal coefficient.

3. The control apparatus according to claim 1, wherein said renewal coefficient computing means set said renewal coefficient to a value obtained by dividing said output voltage limit value by said vector sum, and when said renewal coefficient is equal to or smaller than 1, said M-axis current regulation means renews said M-axis integration value so that said M-axis integration value becomes a result of a product of said M-axis integration value and said renewal coefficient, and said T-axis current regulation means renews said T-axis integration value so that said T-axis integration value becomes a result of a product of said T-axis integration value and said renewal coefficient.

4. The control apparatus according to claim 1, further comprising:

compensation voltage computing means for computing an M-axis voltage compensation value and a T-axis voltage compensation value based on said actual values of said M-axis and T-axis current components, said M-axis and T-axis current reference values and an equivalent resistance value and an equivalent inductance value of said AC motor;

M-axis adding means for setting a new M-axis voltage reference value to be a sum of said M-axis voltage compensation value and said M-axis voltage reference value output from said M-axis current regulation means; and T-axis adding means for setting a new T-axis voltage reference value to be a sum of said T-axis voltage compensation value and said T-axis voltage reference value output from said T-axis current regulation means.

5. A control apparatus for conducting a variable speed control of an AC motor by controlling an M-axis component and a T-axis component of a current flowing through said AC motor, the direction of said M-axis component being parallel to a magnetic field of said AC motor and the direction of said T-axis component being orthogonal to the direction of said M-axis current component, said control apparatus comprising:

M-axis current regulation means for executing proportional plus integral computation on a difference between an actual value of said M-axis component and an M-axis current reference value to obtain an M-axis proportional value and an M-axis integration value, and for determining an M-axis voltage reference value for controlling said AC motor by adding said M-axis proportional value to said M-axis integration value;

T-axis current regulation means for executing proportional plus integral computation on a difference between an actual value of said T-axis component and a T-axis current reference value to obtain a T-axis proportional value and a T-axis integration value, and for determining a T-axis voltage reference value for controlling said AC motor by adding said T-axis proportional value to said T-axis integration value; and renewal coefficient computing means for computing a vector sum of said M-axis integration value and said T-axis integration value, determining a renewal coefficient for renewing said M-axis integration value and said T-axis integration value based on said vector sum and a predetermined output voltage limit value, and outputting said renewal coefficient to said M-axis current regulation means and said T-axis current regulation means.

6. The control apparatus according to claim 5, wherein when said renewal coefficient is equal to or smaller than a predetermined value, said M-axis current regulation means renews said M-axis integration value so that said M-axis integration value becomes a result of a product of said M-axis integration value and said renewal coefficient, and said T-axis current regulation means renews said T-axis integration value so that said T-axis integration value becomes a result of a product of said T-axis integration value and said renewal coefficient.

7. The control apparatus according to claim 5, wherein said renewal coefficient computing means set said renewal coefficient to a value obtained by dividing said output voltage limit value by said vector sum, and when said renewal coefficient is equal to or smaller than 1, said M-axis current regulation means renews said M-axis integration value so that said M-axis integration value becomes a result of a product of said M-axis integration value and said renewal coefficient, and said T-axis current regulation means renews said T-axis integration value so that said T-axis integration value becomes a result of a product of said T-axis integration value and said renewal coefficient.

8. The control apparatus according to claim 5, further comprising:

compensation voltage computing means for computing an M-axis voltage compensation value and a T-axis voltage compensation value based on said actual values of said M-axis and T-axis current components, said M-axis and T-axis current reference values and an equivalent resistance value and an equivalent inductance value of said AC motor;

M-axis adding means for setting a new M-axis voltage reference value to be a sum of said M-axis voltage compensation value and said M-axis voltage reference value output from said M-axis current regulation means; and T-axis adding means for setting a new T-axis voltage reference value to be sum of said T-axis voltage compensation value and said T-axis voltage reference value output from said T-axis current regulation means.

9. A control method for conducting a variable speed control of an AC motor by controlling an M-axis component and a T-axis component of a current flowing through said AC motor, the direction of said M-axis component being parallel to a magnetic field of said AC motor and the direction of said T-axis component being orthogonal to the direction of said M-axis current component, said control method comprising the steps of:

executing proportional plus integral computation on a difference between an actual value of said M-axis component and an M-axis current reference value to obtain an M-axis proportional value and an M-axis integration value, and determining an M-axis voltage reference value for controlling said AC motor by adding said M-axis proportional value to said M-axis integration value;

executing proportional plus integral computation on a difference between an actual value of said T-axis component and a T-axis current reference value to obtain a T-axis proportional value and a T-axis integration value, and determining a T-axis voltage reference value for controlling said AC motor by adding said T-axis proportional value to said T-axis integration value; and computing a vector sum of said M-axis voltage reference value and said T-axis voltage reference value, and determining a renewal coefficient for renewing said M-axis integration value and said T-axis integration value based on the relation between said vector sum and a predetermined output voltage limit value.

10. The control method according to claim 9, wherein when said renewal coefficient is equal to or smaller than a predetermined value, said M-axis integration value is renewed so that said M-axis integration value becomes a result of a product of said M-axis integration value and said renewal coefficient, and said T-axis integration value is renewed so that said T-axis integration value becomes a result of a product of said T-axis integration value and said renewal coefficient.

11. The control method according to claim 9, further comprising the steps of:

setting said renewal coefficient to a value obtained by dividing said output voltage limit value by said vector sum;

renewing said M-axis integration value so that said M-axis integration value becomes a result of a product of said M-axis integration value and said renewal coefficient when said renewal coefficient is equal to or smaller than 1; and renewing said T-axis integration value so that said T-axis integration value becomes a result of a product of said T-axis integration value and said renewal coefficient when said renewal coefficient is equal to or smaller than 1.

12. The control method according to claim 9, further comprising the steps of:

computing an M-axis voltage compensation value and a T-axis voltage compensation value based on said actual values of said M-axis and T-axis current components, said M-axis and T-axis current reference values and an equivalent resistance value and an equivalent inductance value of said AC motor;

setting a new M-axis voltage reference value to be a sum of said M-axis voltage compensation value and said M-axis voltage reference value; and setting a new T-axis voltage reference value to be a sum of said T-axis voltage compensation value and said T-axis voltage reference value.

13. A control method for conducting a variable speed control of an AC motor by controlling an M-axis component and a T-axis component of a current flowing through said AC motor, the direction of said M-axis component being parallel to a magnetic field of said AC motor and the direction of said T-axis component being orthogonal to the direction of said M-axis current component, said control method comprising the steps of:

executing proportional plus integral computation on a difference between an actual value of said M-axis component and an M-axis current reference value to obtain an M-axis proportional value and an M-axis integration value, and determining an M-axis voltage reference value for controlling said AC motor by adding said M-axis proportional value to said M-axis integration value;

executing proportional plus integral computation on a difference between an actual value of said T-axis component and a T-axis current reference value to obtain a T-axis proportional value and a T-axis integration value, and determining a T-axis voltage reference value for controlling said AC motor by adding said T-axis proportional value to said T-axis integration value; and computing a vector sum of said M-axis integration value and said T-axis integration value, and determining a renewal coefficient for renewing said M-axis integration value and said T-axis integration value based on the relation between said vector sum and a predetermined output voltage limit value.

14. The control method according to claim 13, wherein when said renewal coefficient is equal to or smaller than a predetermined value, said M-axis integration value is renewed so that said M-axis integration value becomes a result of a product of said M-axis integration value and said renewal coefficient, and said T-axis integration value is renewed so that said T-axis integration value becomes a result of a product of said T-axis integration value and said renewal coefficient.

15. The control method according to claim 13, further comprising the steps of:

setting said renewal coefficient to a value obtained by dividing said output voltage limit value by said vector sum;

renewing said M-axis integration value so that said M-axis integration value becomes a result of a product of said M-axis integration value and said renewal coefficient when said renewal coefficient is equal to or smaller than 1; and renewing said T-axis integration value so that said T-axis integration value becomes a result of a product of said T-axis integration value and said renewal coefficient when said renewal coefficient is equal to or smaller than 1.

16. The control method according to claim 13, further comprising the steps of:

computing an M-axis voltage compensation value and a T-axis voltage compensation value based on said actual values of said M-axis and T-axis current components, said M-axis and T-axis current reference values, and an equivalent resistance value and an equivalent inductance value of said AC motor;

setting a new M-axis voltage reference value to be a sum of said M-axis voltage compensation value and said M-axis voltage reference value; and setting a new T-axis voltage reference value to be a sum of said T-axis voltage compensation value and said T-axis voltage reference value.

* * * * *